United States Patent
Kajiyama et al.

[11] Patent Number: 6,108,296
[45] Date of Patent: Aug. 22, 2000

[54] OPTICAL RECORDING DISC CAPABLE OF PREVENTING ILLEGAL COPY

[75] Inventors: Seiji Kajiyama, Ibi-gun; Youichi Tsuchiya, Hashima; Kenji Torazawa, Ogaki; Kouichi Tada, Motosu-gun, all of Japan

[73] Assignee: Sanyo Electric Co., Ltd., Osaka, Japan

[21] Appl. No.: 09/136,458

[22] Filed: Aug. 19, 1998

[30] Foreign Application Priority Data

Aug. 20, 1997 [JP] Japan ................................. 9-240359
Aug. 20, 1997 [JP] Japan ................................. 9-240432

[51] Int. Cl.[7] ............................................. G11B 7/24
[52] U.S. Cl. ............................................. 369/275.4
[58] Field of Search ........................ 369/275.3, 275.4, 369/275.2, 84, 58, 44.26; 360/60

[56] References Cited

U.S. PATENT DOCUMENTS

| | | | |
|---|---|---|---|
| 5,538,773 | 7/1996 | Kondo | 428/64.1 |
| 5,570,339 | 10/1996 | Nagano | 369/275.3 |
| 5,572,507 | 11/1996 | Ozaki et al. | 369/275.4 |
| 5,696,757 | 12/1997 | Ozaki et al. | 369/275.4 |
| 5,807,640 | 9/1998 | Ueno et al. | |
| 5,809,006 | 9/1998 | Davis et al. | 369/275.4 |
| 5,812,501 | 9/1998 | Moribe et al. | 369/14 |
| 5,818,812 | 10/1998 | Moribe et al. | 369/275.1 |
| 5,875,156 | 2/1999 | Ito et al. | 369/32 |
| 5,886,979 | 3/1999 | Moribe et al. | 369/275.3 |

*Primary Examiner*—Tan Dinh
*Attorney, Agent, or Firm*—Armstrong, Westerman, Hattori, McLeland & Naughton

[57] ABSTRACT

Micro-pits or micro-pit strings, which are disabled precise copying by means of illegal copying described above and enable signals different from signals of a normal disc to be detected in case of failure in precise copying, are recorded in a copy protected area of an optical disc beforehand. A read unit checks the copy protected area and determines a loaded disc is legal disc or illegally copied disc. If illegal, reading is prohibitted.

2 Claims, 10 Drawing Sheets

(a) Normal Disc (b) Copied Disc

Fig.1
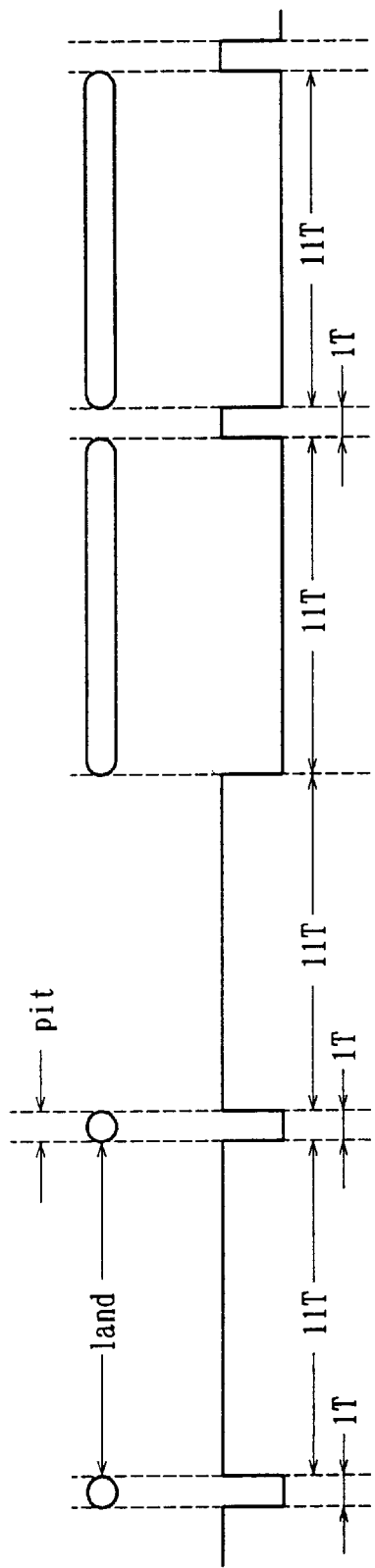
(a) Normal Disc
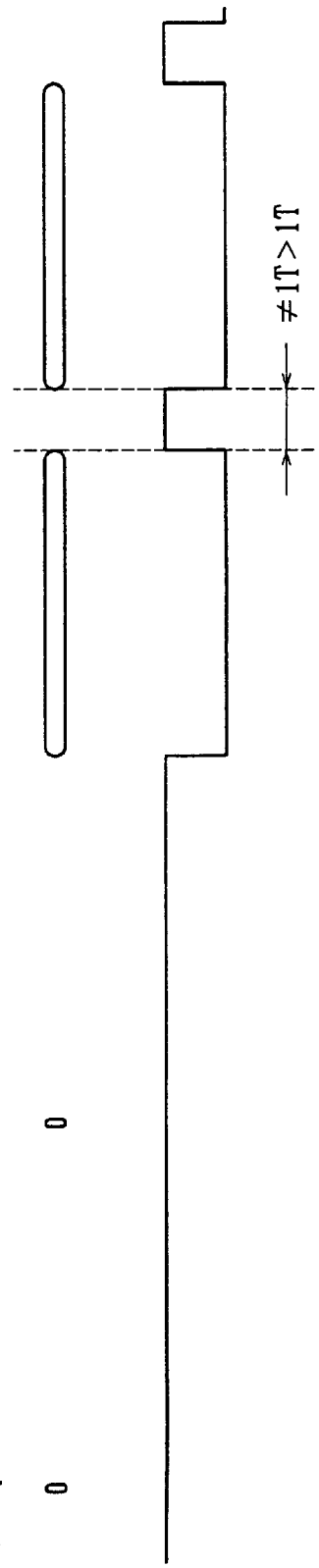
(b) Copied Disc

Fig.5
(a)
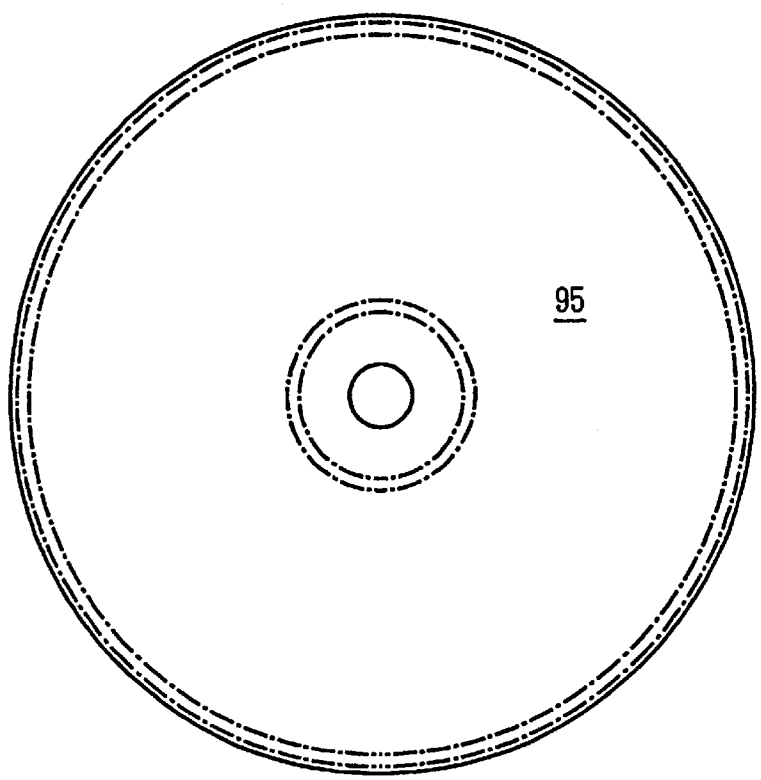
(b)
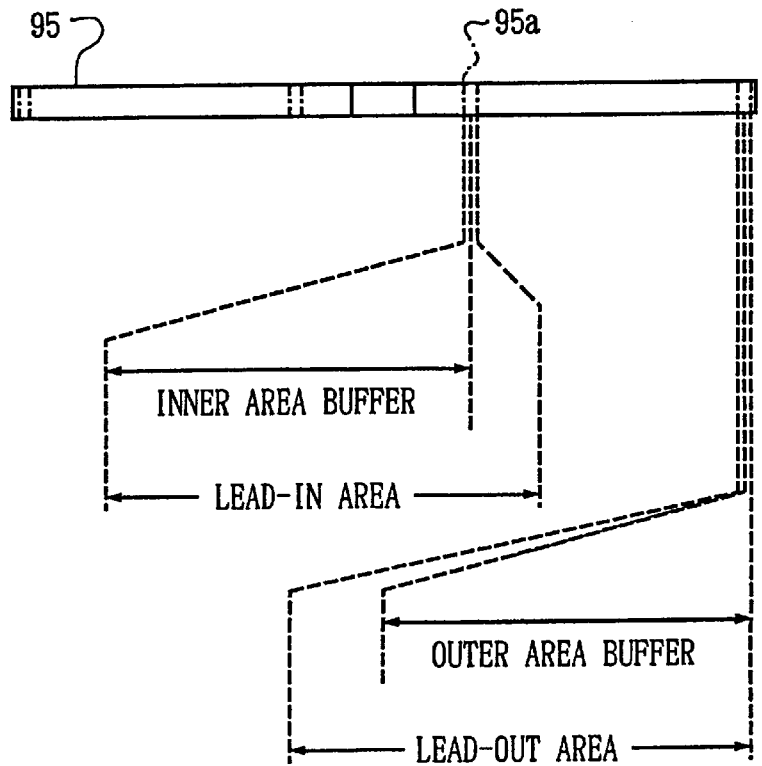

Fig.9
(a) 
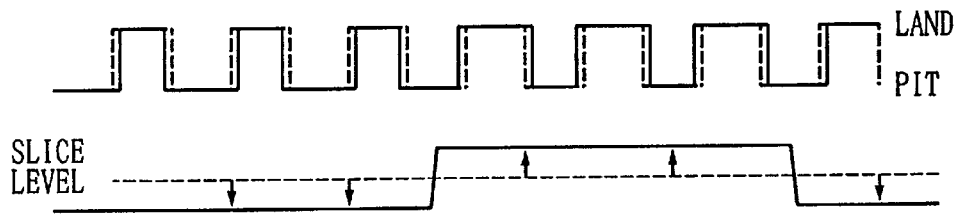
(b)
① RECTANGULAR 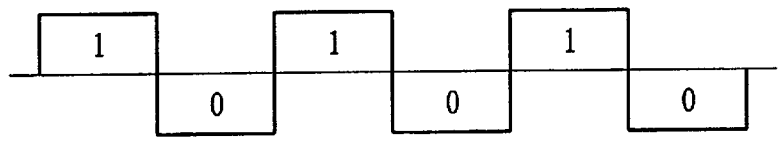
② SINUSOIDAL 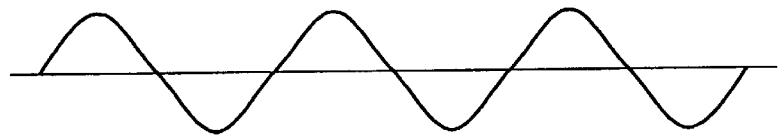
③ TRIANGULAR 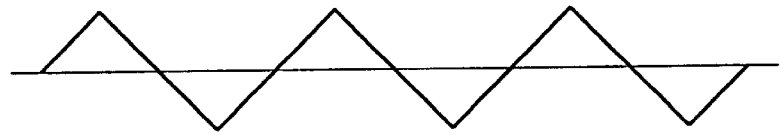
(c) 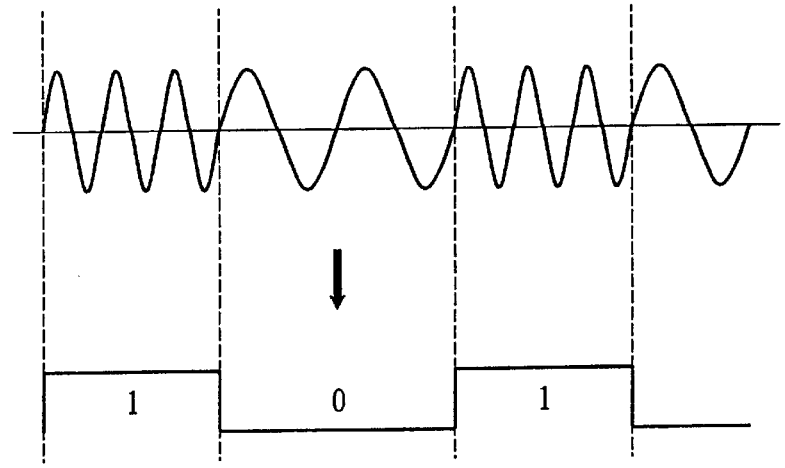

Fig.10

| HEADER | VENDOR CODE | DATA | LOT NO. |

OPTICAL RECORDING DISC CAPABLE OF PREVENTING ILLEGAL COPY

BACKGROUND OF THE INVENTION

1. Field of the Invention

This invention generally relates to the protection of optical discs from illegal copying, and more particularly to optical discs provided with an illegal copying preventing function, recorders for recording signals in the original discs of the optical discs, and readout units for the optical discs.

2. Related Art

In a compact disc (CD), which is a read-only optical disc, signals have been EFM modulated and recorded as pits (or lands) of 3T to 11T long. Here, T is a 1-channel bit period, that is, the length of a pit (or "a land") that regenerates a signal having a predetermined read clock length. Hereinafter in this specification, T will be used with this meaning.

To record the EFM-modulated signal as pits of integer times as long as T within a range of 3T to 11T, the duty cycle of the EFM-modulated signal is compensated. This is signal compensation considering the beam waist of a recording laser beam. That is, when an original disc is subjected to laser beam cutting in accordance with such compensated signal, the pits are formed exactly to a length of integer times as long as T within a range of 3T to 11T. For this compensation, a recorder for original discs is equipped with a duty compensator between an EFM encoder and an E/O modulator.

The illegal copying of optical discs are performed in such a way that, for example, a protective film is removed from a normally manufactured optical disc, a stamper is made by being plated with the exposed aluminum reflection layer used as an electrode, and a copied optical disc is made by injection molding or the like using this illegal stamper.

SUMMARY OF THE INVENTION

There are demands for protecting against illegal copy of read-only optical discs. Also, there are demands for identifying illegally copied optical discs. Furthermore, there are demands for providing a readout unit provided with functions of disabling the readout of illegal discs.

It is a primary object of the present invention to satisfy such demands.

The present invention is to provide a device in which micro-pits (pit length: 1T, for example) which are disabled precise copying by means of illegal copying described above and enable signals different from signals of a normal disc to be detected in case of failure in precise copying are recorded in an optical disc beforehand, determination is made whether the subject disc is a normal disc or not based on whether these micro-pits are normally detected or not, and readout of the subject disc is enabled or disabled based on such determination. The micro-pits or micro-pit strings recorded in the optical disc according to the present invention can not be precisely copied by any method which has been conventionally used for illegal copying. Therefore, it can be determined whether a loaded disc is an illegally copied disc or a normal disc based on whether the micro-pits are detected or not or based on the signals read out of the micro-pit strings are normal or not. Also, based on the results of such determination, reading of illegal discs can be disabled.

Still also, the present invention is to provide a device in which micro-variations which are disabled precise copying by means of illegal copying and enable duty variation components different from duty variation components of a normal disc to be detected in case of failure in precise copying are provided to the pit length of an optical disc beforehand, determination is made whether the subject disc is a normal disc or not based on whether such micro-variations are normally detected or not, and readout of the subject disc is enabled or disabled based on such determination. The micro-variations provided to the pit length of the optical disc according to the present invention can not be precisely copied by any method which has been conventionally used for illegal copying. Therefore, it can be determined whether a disc is an illegally copied disc or a normal disc based on whether the micro-variations of the pit length are present or not or based on whether the micro-variations of the pit length are coincided with the micro-variations which should have been recorded in the normal disc. Also, based on the results of such determination, readout of illegal discs can be disabled.

BRIEF DESCRIPTION OF THE DRAWINGS

FIG. 1(a) shows pits and recorded/regenerated signals of a copy protected area of a normal disc according to the first embodiment; FIG. 1(b) shows pits and a regenerated signal of a copy protected area of a copied disc obtained by means of illegal copying of the normal disc of FIG. 1(a);

FIG. 5 is a descriptive view depicting recording positions of pits or pit strings for protecting against illegal copying;

FIG. 9(a) is a descriptive view showing variations in slice level in reading; FIG. 9(b) is a waveform view illustrating various micro-variations; and FIG. 9(c) is a descriptive view showing a method of recording data by modifying sinusoidal waveform of micro-variations.

FIG. 10 is an example of a format of additional information incorporated to main data.

DETAILED DESCRIPTION OF THE PREFERRED EMBODIMENTS

Figure 2:
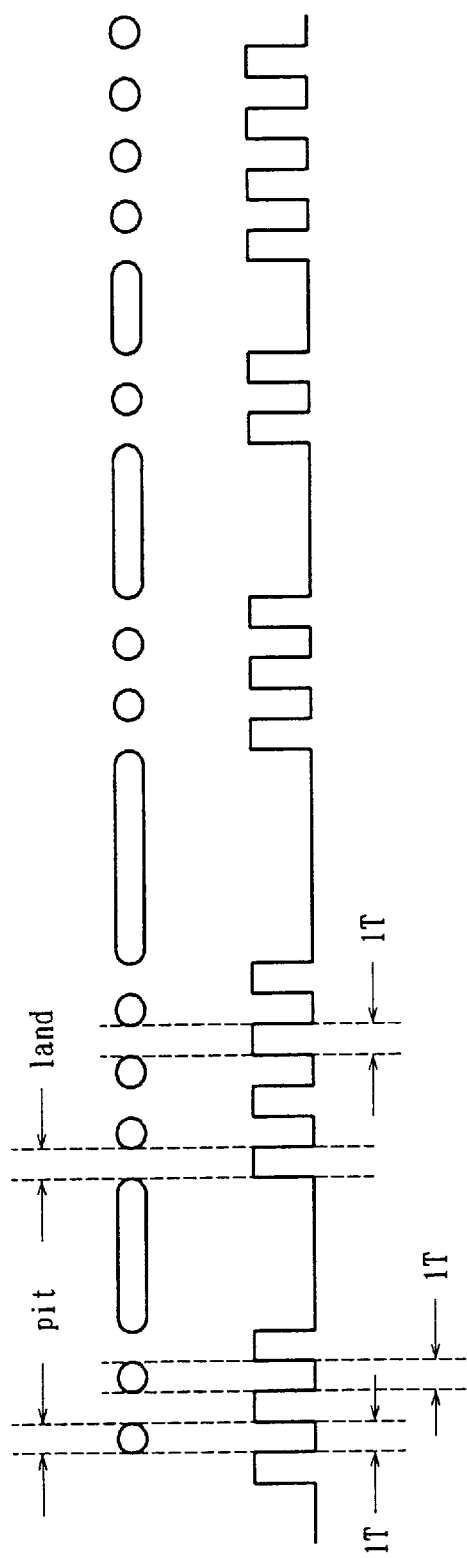
FIG. 2(a) shows pits and recorded/regenerated signals of a copy protected area of a normal disc according to the second embodiment.
FIG. 2(b) shows pits and a regenerated signal of a copied disc obtained by means of illegal copying of the normal disc of FIG. 2(a)

Now, preferred embodiments of the present invention will be described by referring to the appended drawings.

1. First Embodiment (an optical disc having micro pits)

As normal recording signals are EFM-modulated and recorded, the pit length thereof takes a value of integer times as long as T within a range of 3T to 11T. In a copy protected area of a normal disc according to the first embodiment, micro-pits of 1T in pit length are recorded at intervals of 11T as shown in FIG. 1. Hereinafter in this specification, the portion between pits is referred to as "land.". Also, in the first embodiment, the signal corresponding to portions where a pair of 1T-long pit and 11T-long land are repeated is referred to as "a copy protecting signal." In the copy protected area, a repetitive portion where the pit length is 11T and the clearance from the adjoining pits is 1T is alternately provided in a certain cycle to suppress the DC components in such area. The signal corresponding to this repetitive portion with a 11T-long pit and a 1T-long land is referred to as "a compensation signal."

When a normal disc having such copy protected area is illegally copied by the method described above, that is, a protective film is removed from the normal disc, a stamper is made by being plated with the exposed aluminum reflection layer used as an electrode, and a illegal copied optical disc is made by injection molding or the like using the illegal stamper, each pit becomes slightly smaller and each pit length becomes slightly shorter than corresponding pit and pit length of the normal disc, respectively, as shown in the upper part of FIG. 1(b). As a result, most micro-pits of 1T long in the copy protected area are broken, and no micro-pit appears in the readout signal as shown in the lower part of FIG. 1(b). By making use of this, the normal disc according to the first embodiment can be distinguished from the copied disc thereof.

In FIG. 1, the pit length of the micro-pit is 1T and the interval between the pits is 11T. However, the pit length is not always limited to 1T, and the interval between the micro-pits is not always limited to 11T. The pit length of the micro-pit and the interval between the micro-pits can be determined as values which enable the micro-pit to be optically detected considering the diameter of a laser beam spot for reading.

For example, when two or more periods of the micro-pits are contained together in the reading beam spot, as it is impossible to optically detect such micro-pits, such case should be eliminated. As a method of controlling the micro-pits contained in the reading beam spot to be two periods or less, for example, there is a method which adjusts the pit length of the micro-pit to ¼ or more of the diameter of the reading beam spot.

Furthermore, the pit length of the micro-pit should be set as a value other than 3T to 11T which are used for information to be recorded. The pit length of the micro-pit should also be set as a value which can rarely read from the copy protected area when the micro-pits are broken by the illegal copying described above.

From the viewpoint of the above, the pit length of the micro-pit should be less than 3T, and preferable be less than 2T. Furthermore, in order not to substantially alter the EFM encoder of the recorder for making original discs, the pit length of the micro-pit should preferably be of integer times as long as T. Taking these into consideration, the pit length of the micro-pit should preferably be 1T. However, the pit length of the micro-pit is not always limited to integer times as long as T. The interval between the micro-pits should preferably be in a range of 5T to 11T or so. The above discussion can also be applied to a case where the pit and land follow the physical format of the compact disc and to a case where the pit and land are compressed to be higher in density compared with the physical format of the compact disc.

Also, in the above, description is made to a case where a signal is recorded as pits. However, if a signal is recorded as lands, if the "micro-pit" is read as "micro-land" and the "pit" is read as "land," the discussion similar to the above will make sense.

2. Second Embodiment (an optical disc having micro-pit strings)

According to the first embodiment described above, each micro-pit is isolated, and when such micro-pit is optically detected, the disc is determined as a normal disc, and when such micro-pit is not optically detected, the disc is determined as an illegally copied disc. In contrast, according to the second embodiment, a plurality of micro-pits are formed at short intervals to form a micro-pit string, and when such micro-pit string is not optically detected, the disc is determined as a normal disc, and when such micro-pit string is optically detected as a land, the disc is determined as an illegally copied disc.

In the copy protected area of a disc according to the second embodiment, as shown in FIG. 2(a), a plurality of micro-pits with a pit length of 1T are arranged at comparatively short intervals to form a micro-pit string. Each of the intervals is 1T in this case. Between the micro-pit strings are a pit having a comparatively long period is disposed. The length of each pit between the micro-pit strings is not constant in FIG. 2, but such length may be arranged constant. Also, instead of a pit disposed between the micro-pit stings, a land may be disposed.

Here, according to the second embodiment, a signal corresponding to a combination of the micro-pit string recorded in the copy protected area and the pit or land disposed between such micro-pit strings is referred to as "a copy protecting signal."

When a normal disc having such copy protected area is copied by the illegal method described above, that is, the protective film is removed from the normal disc and a stamper is made by being plated with the exposed aluminum reflection layer used as an electrode, and such stamper is used for copying, the pit becomes slightly smaller and the pit length becomes slightly shorter compared with the normal disc as shown in the upper part of FIG. 2(b). As a result, most micro-pits of 1T long are broken, and a signal corresponding to land reflection light is detected from each portion of the micro-pit string as shown in the lower part of FIG. 1(b).

That is, while a signal of reference level, which is neither a land reflection light nor a pit reflection light, is detected from the micro-pit string of the normal disc (the reason for which will be described later), a signal corresponding to a land reflection light is detected from the corresponding portion of the illegally copied disc. By making use of this, discrimination can be made between the normal disc according to the second embodiment and the copied disc thereof.

In FIG. 2, the pit length c each micro-pit composing amicro-pit string and the interval between the adjoining micro-pits are set equally to 1T. However, the pit length of the micro-pit and the interval between the adjoining micro-pits is not always limited to 1T or be equal to each other. Furthermore, the number of the micro-pits shown in FIG. 2 is 2 to 4 for the reason of expressing convenience, but this number is not limited to 2 to 4 but may be larger with no problem. The pit length of each micro-pit composing a micro-pit string and the interval between the adjoining micro-pits may be determined as a value which can optically detect the micro-pit strings considering the diameter of the reading beam spot.

For example, a case where 2 or more periods of the micro-pits are contained together in the reading beam spot may be employed, as it is impossible to optically detect these micro-pits in such case. On the other hand, as a method of adjusting the micro-pits contained in the reading beam spot to be 2 or more periods, when, for example, the wavelength of the reading beam is $\lambda$ and the numerical aperture of an objective which focuses the reading beam onto the signal recording surface is NA, the pit length of the micro-pit may be set to "$\lambda/(4 \times NA)$" or less.

Furthermore, the pit length of each micro-pit composing a micro-pit string should be set as a value which enables the micro-pit to be broken due to the illegal copying described above and thereby linked to the adjoining lands preceding and following thereof. Moreover, from the viewpoint of not significantly altering the EFM encoder of the recorder for making original discs, the pit length of each micro-pit composing a micro-pit string and the interval between the adjoining micro-pits should preferably be integral times as long as T, and specifically should be 1T.

3. Third Embodiment (a recorder)

Now, referring to FIG. 3, a recording unit for recording signals onto an original disc of optical discs according to each embodiment described above will be described.

An input signal is EFM-modulated by an EFM encoder 11. According to EFM modulated bit data, an E/O modulation controller 13 controls an E/O modulator 15. This E/O modulator 15 modulates a laser beam output from a laser 14, and this modulated laser beam is irradiated onto a photoresist layer of an original disc 91. Thereby, the photoresist layer is cut according to the EFM-modulated bit data.

When a signal is recorded in the copy protected area, instead of the normal input signal, a signal for the copy protected area is inputted from a copy protecting signal generator 18 into the EFM encoder 11. As this copy protecting signal, when an original disc for the optical discs according to the first embodiment is made, a signal for outputting the signal shown in the lower part of FIG. 1(a) from the EFM encoder 11 is input. When an original disc for the optical discs according to the second embodiment is made, a signal for outputting the signal shown in the lower part of FIG. 2(a) from the EFM encoder 11 is input.

Figure 3:
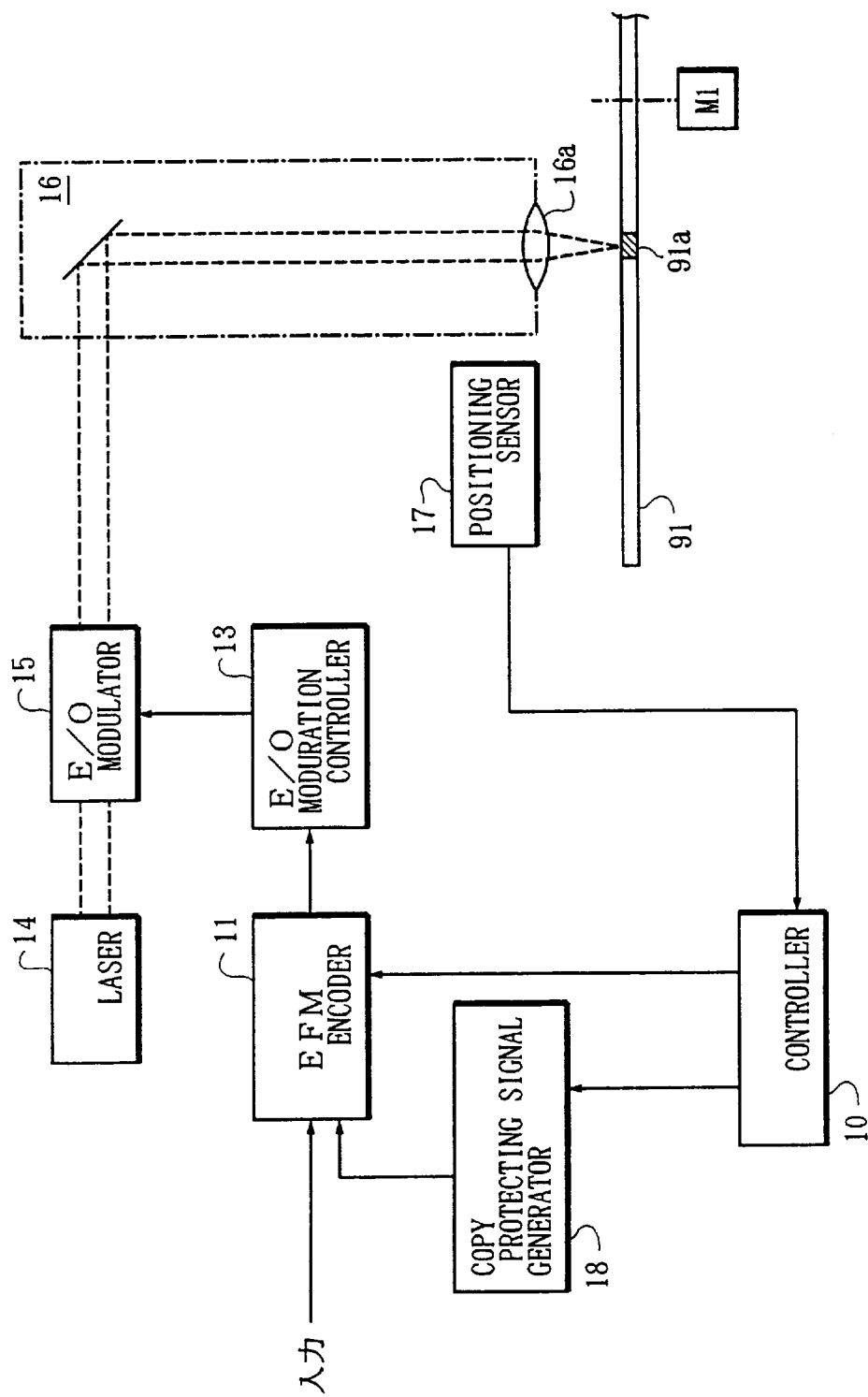
FIG. 3 is a block diagram of a recorder for an original disc of optical discs according to the first and second embodiments.

As a copy protected area, a lead-in area 91a is shown in FIG. 3. However, as described later, such copy protected area is not always limited to the lead-in area 91a.

That the laser beam to be irradiated through an objective 16a is positioned in the copy protected area can be detected by inputting the signal of a positioning sensor 17 for detecting the position of an optical system 16 into a controller 10.

4. Fourth Embodiment (a readout unit)

By referring to FIG. 4, description will be given to a readout unit for reading the recorded signals of an optical disc 95 according to each embodiment described above.

A reflected light from the disc 95 is photoelectrically converted by an optical pickup 51, and then sent to an RF amplifier 52 and outputted therefrom as an RF digital signal. This RF digital signal is input into a CD/CD-ROM decoder 53, demodulated thereby, and output therefrom to an outer circuit (not illustrated). When a recorded signal in the copy protected area is read, the RF digital signal is sent to a copy protecting signal discriminator 56. Here, it may be so arranged that when the disc is set, the readout unit reads the predetermined copy protected area first of all. The copy protecting signal discriminator 56 determines whether the copy protecting signal is present or not.

For example, when the disc is formed with isolated micro-pits like the optical disc according to the first embodiment, it is determined whether the signal corresponding to the micro-pit of 1T long is read as shown in the lower part of FIG. 1(a) or the signal corresponding to the micro-pit of 1T long is not read as shown in the upper part of FIG. 1(b). In the former case, the disc is determined as a normal disc, and in the latter case, the disc is determined as an illegally copied disc.

When the disc is formed with micro-pit strings like the optical disc according to the second embodiment, it is determined whether the signals corresponding to the micro-pit strings are not detected (the reference level is detected) or the signals corresponding to the lands are detected from the portions corresponding to the micro-pit strings as shown in the lower part of FIG. 2(b). In the former case, the disc is determined as a normal disc, and in the latter case, the disc is determined as an illegally copied disc.

The results of the determination made by the copy protecting signal discriminator 56 are sent to a controller 50. When the loaded disc is determined as an illegally copied disc by the copy protecting signal discriminator 56, the controller 50 stops a spindle motor M2, issues an alarm to a display panel 59 to the effect that the disc was illegally copied, and take the necessary actions, such as activating a disk ejector 58 to eject the illegally copied disc.

Figure 4:
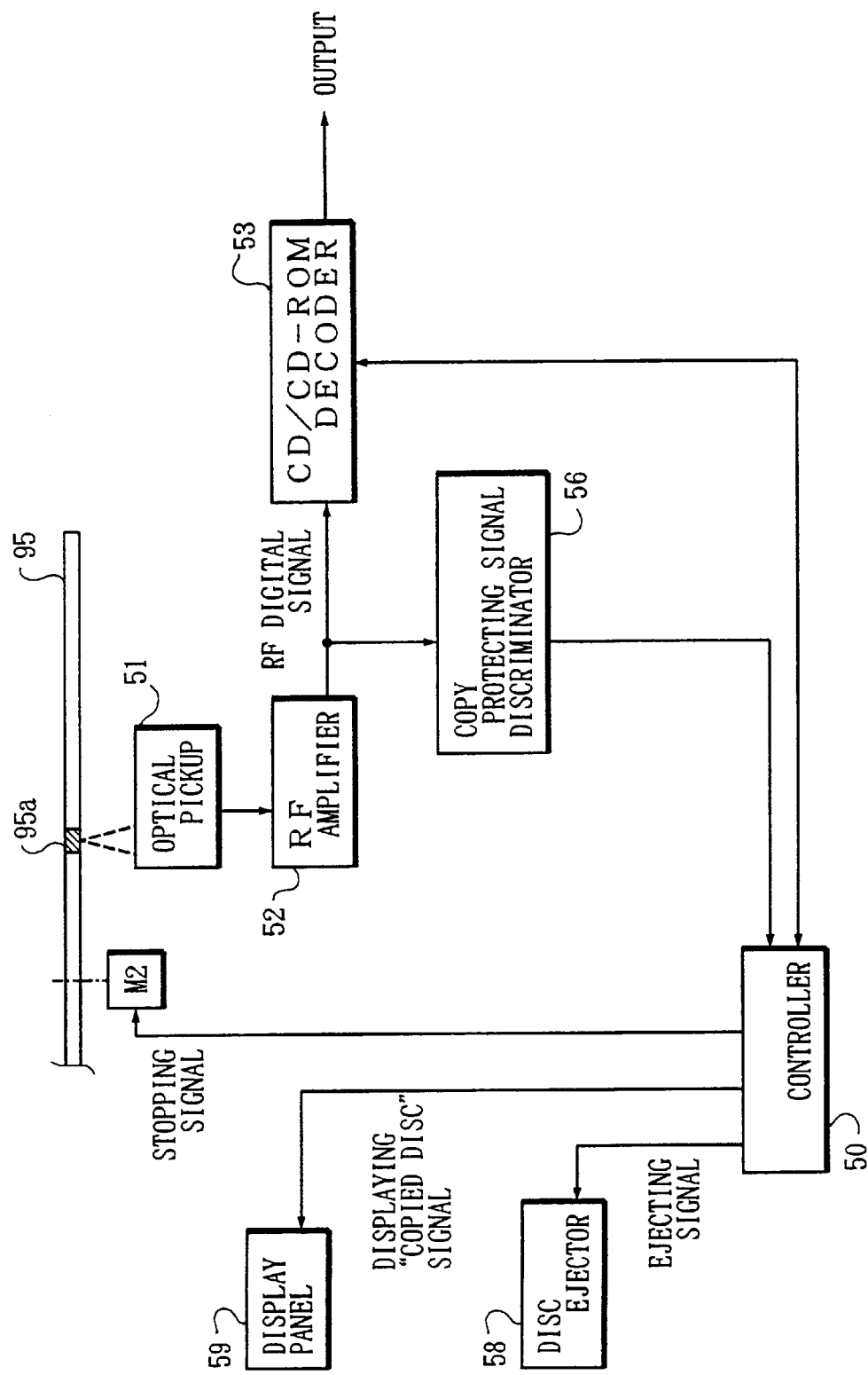
FIG. 4 is a block diagram of a readout unit for optical discs according to the first and second embodiments.

As a copy protected area, a lead-in area 95a is shown in FIG. 4. However, as described later, the copy protected area is not always limited to the lead-in area 95a.

That the laser beam irradiated to the optical disc 95 is positioned in the copy protected area can be detected by inputting a positioning sensor signal (not illustrated) into the controller 50.

FIG. 5 shows the copy protected area within the optical disc 95. The copy protected area may be provided, for example, in the lead-in area 95a or a lead-out area. When the physical format of the optical disc is of compact disc format, the copy protected area may be provided in an inner area buffer (not illustrated) or an outer area buffer (not illustrated). When the format is higher in density than the compact disc format and has not yet been established, the copy protected area may be provided not merely in the lead-in area or in the lead-out area but also in any other position. When the copy protected area is provided in any position, and the readout unit is so constructed as to read the copy protected area in the first place, if the loaded disc is a copied disc, the disc can be discriminated and the necessary action for ejection can be taken. This is also applicable to fifth embodiment (an embodiment with micro-variations provided to pits) which will be described below.

5. Fifth Embodiment 5-1. Recorder

A recording unit for recording signals onto an original disc of optical discs according to fifth embodiment will be described referring to FIG. 6 and FIG. 7.

An input signal is EFM-modulated by an EFM encoder 11, inputted into a duty compensator 12, and then subjected to duty compensation as described in the section of Related Art. According to the EFM-modulated, duty-compensated data, an E/O modulation controller 13 controls an E/O modulator 15. A laser beam outputted from a laser 14 is modulated by the E/O modulator 15, and irradiated onto a photoresist layer of an original disc 91. Thereby, the photoresist layer can be cut so as to correspond to the EFM-modulated, duty-compensated data.

When the signal is written in the copy protected area, which is an object area to be provided with regular micro-variations to the pit length, a signal to this effect is sent from a controller 10 to a duty compensator 12. This signal controls the delay time in a programmable delay circuit 121 as shown in FIG. 7. When the delay time in the programmable delay circuit 121 is controlled, the amount of duty compensation is controlled according to the delay time. That is, in the duty compensator 12, the input signal from the EFM encoder 11 and a delay signal, which is such input signal but delayed by the programmable delay circuit 121, are inputted into an AND circuit (or an OR circuit) 122 to be logically operated for product (or logical sum). As a result, the duty-compensated signal is outputted as shown in the right under of FIG. 7. Therefore, by controlling the data sent from the controller 10 to the programmable delay circuit 121 to be conformable to the desired rules, the duty cycle can be micro-varied so as to be conformable to the desired rules.

When the EFM signal with a varied duty cycle is read, a slice level varies as shown in FIG. 9(a) according to such EFM signal. When the amount of compensation of the pit duty cycle is assumed fixed, the slice level can be varied to be rectangular as shown in ① of FIG. 9(b). When the amount of compensation of the pit duty cycle is continuously varied, the slice level can be varied sinusoidally as shown in ② of FIG. 9(b) or triangularly as shown in 3 of FIG. 9(b). When the slice level is rectangular, the desired data can be expressed in combination of "1" and "0." An example of the desired data is security information. The frequency range of each waveform shown in FIG. 9(b) is, for example, double in the recording density of the physical format of the compact disc, and when the laser cutting linear velocity is 0.9±0.1 m/sec, such frequency range is 100 Hz to 50 kHz. This is because if the frequency is lower than 100 Hz, side-runout components of approx. 10 Hz can not be separated, and if the frequency is higher than 50 kHz, frequency components of 200 kHz corresponding to 11T can not be separated with a low-pass filter. This is also applicable to a case where the disc is conformable to the physical format of the compact disc, and the laser cutting linear velocity is 1.2 m/sec. It may also be so arranged that the frequency of sinusoidal wave, etc. described above is modulated as shown in FIG. 9(c) to be corresponding to "0" and "1." Thereby, the desired data can be incorporated into the frequency described above. For the sinusoidal wave, FM modulation or other modulation may be applied to the wave.

Figure 6:
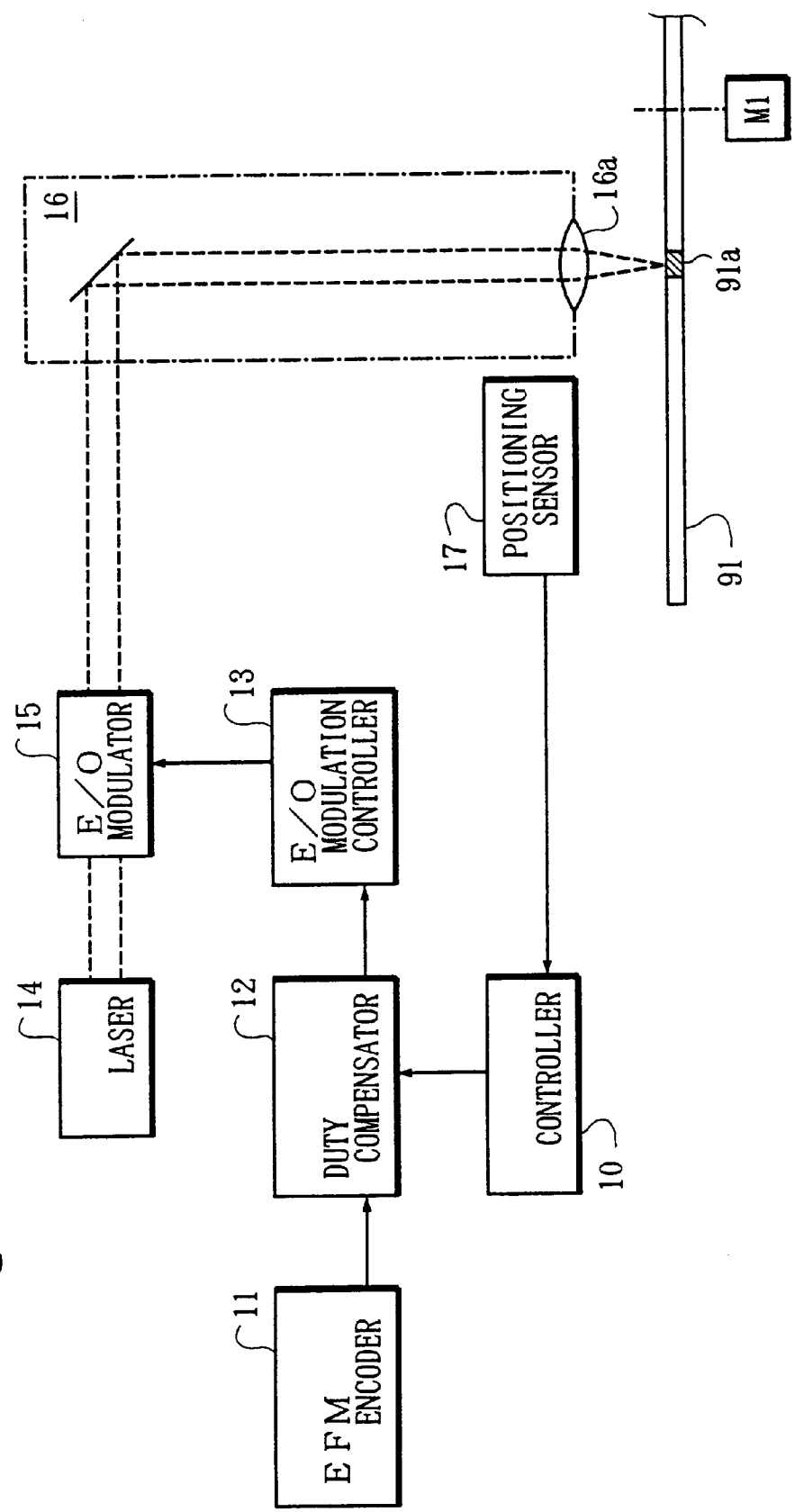
FIG. 6 is a block diagram of a recorder for an original disc of optical discs according to the fifth embodiment.
Figure 7:
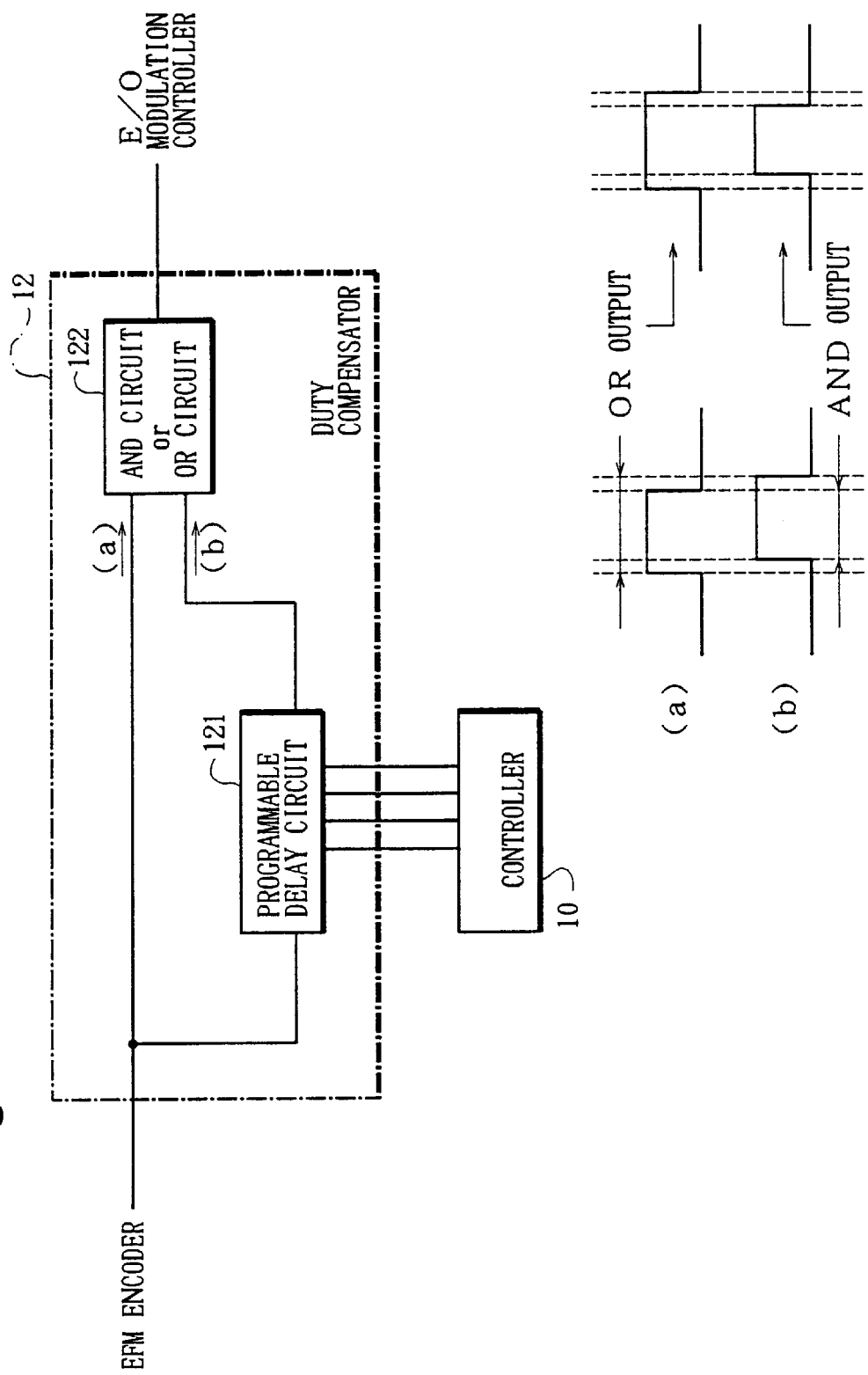
FIG. 7 is a block diagram showing details of a duty compensator 12 of FIG. 6.

As a copy protected area, the lead-in area 91a is shown in FIG. 6. However, the copy protected area is not always limited to the lead-in area 91a.

That the laser beam irradiated through the objective 16a is positioned in the copy protected area can be detected by inputting the signal of a positioning sensor 17, which detects the position of an optical system 16, into a controller 10.

Figure 10:
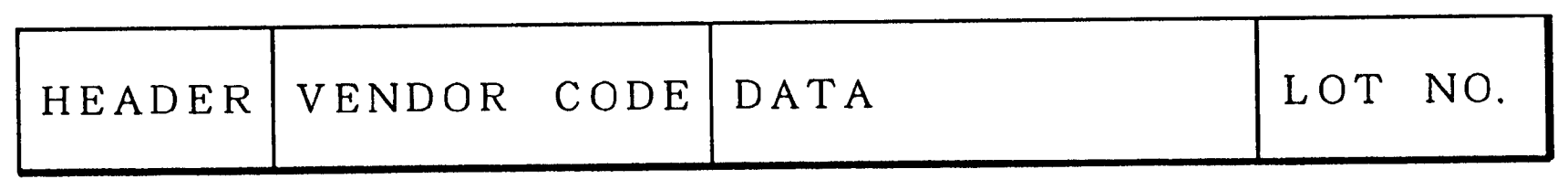

As described above, when the duty cycle of an EFM signal is minutely varied and then recorded on a disc, the slice level of the EFM signal read from the disc varies. Then, it is possible to generate binary data composed of 1 and 0 based on the variation in the slice level. Therefore, by controlling the minute variation in the above duty cycle, it is possible to incorporate desired binary data. As such binary data, additional information, such as character, sound and still image, vendor code, lot No., etc. can be named in addition to the above security information. An example of the formats for recording such information is shown in FIG. 10. In the format shown in FIG. 10, each area is assigned with the predetermined bit number. The information, such as character, sound and still image, is recorded into the data area as code data. Copy protect information maybe recorded in the data area. In this case, the code value obtained through operational processing of the vender code, lot No. and predetermined key value may be used as copy protect information. By arranging in this way, as the copy protect information can be varied according to the disc, the cope protect ability can be improved.

5-2. Readout Unit

Next, a readout unit for reading a recorded signal of an optical disc 95 made by using an original disc cut by the recorder described above will be described.

A reflected light from the disc 95 is photoelectrically converted by an optical pickup 51, and then sent to an RF amplifier 52 and outputted therefrom as an RF digital signal. This RF digital signal is input into a CD/CD-ROM decoder 53, demodulated thereby, and output therefrom to an outer circuit (not illustrated) as an EFM signal.

The EFM signal outputted from the CD/CD-ROM decoder 53 is inputted into a slice level controller 54 and integrated. This integral value is equivalent to the duty variation. In the normal reading, this integral value is fed back to the RF amplifier 52, and thereby the slice level is controlled. As a result, the quality of the RF digital signal outputted from the RF amplifier 52 is improved.

When the copy protected area is read, the output from the slicelevel controller 54 is switched from the RF amplifier 52 to a duty detecting decoder 55 under the instructions from the controller 50. Here, it may also so arranged that the readout unit reads the predetermined copy protected area in the first place.

As a result of the switching described above, the duty variation is inputted into the duty detecting decoder 55 and compared with the predetermined variation that should have been recorded in the normal disc. The results of this comparison, that is, the results of the comparison to determine whether the variation that is equal to the variation that should have been recorded in the normal disc has been detected or not are sent to a controller 50.

If a signal to the effect that the variation equal to the variation of the normal disc is not detected is inputted from the duty detecting decoder 55 into the controller 50, the controller 50 determines that an illegally copied disc is loaded, and, for example, stops the spindle motor No. 2, issues an alarm to a display panel 59 to the effect that the disc was illegally copied, and take the necessary actions, such as activating a disk ejector 58 to eject the illegally copied disc.

Figure 8:
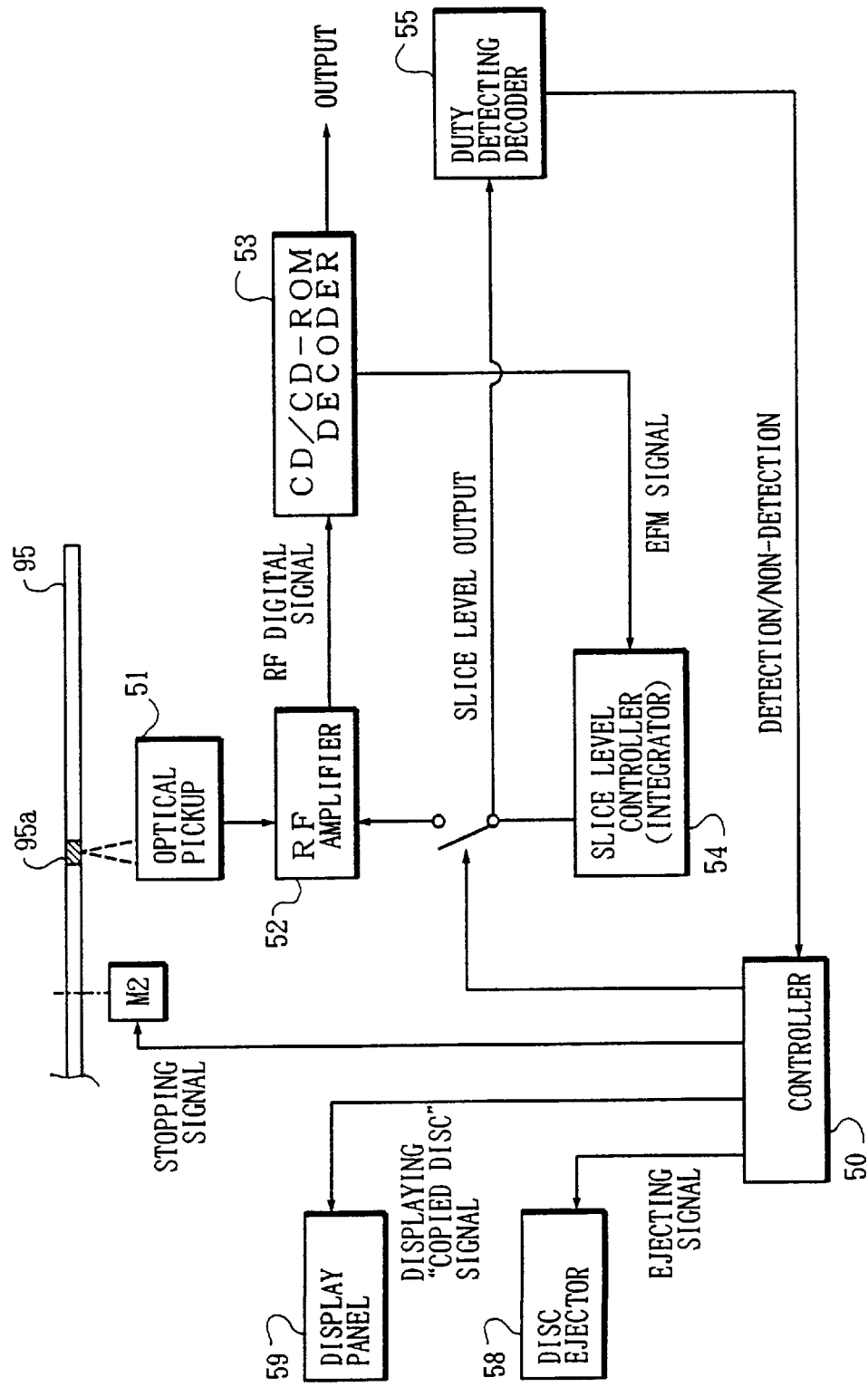
FIG. 8 is a block diagram of a readout unit for a disc according to the fifth embodiment.

As a copy protected area a lead-in area 95a is shown in FIG. 8. However, the copy protected area is not always limited to the lead-in area 95a, but may be a program area. If the copy protected area is a program area, such program area may be a part of a predetermined part of the program area or may be the whole part of the program area.

That the laser beam irradiated to the optical disc 95 is positioned in the copy protected area can be detected by inputting a positioning sensor (not illustrated) ,which detects the position of an optical pickup 51, into the controller 50.

What is claim is:

1. An optical disc having a copy protected area, wherein the copy protected area being provided with micro-pits which are broken by copying the optical disc.

2. An optical disc having a copy protected area, wherein the copy protected area being provided with micro-pit strings which are broken by copying the optical disc.

* * * * *